(12) United States Patent
Lin et al.

(10) Patent No.: US 12,736,785 B2
(45) Date of Patent: Sep. 15, 2026

(54) IMAGING LENS

(71) Applicant: GUANGZHOU LUXVISIONS INNOVATION TECHNOLOGY LIMITED, Guangzhou City (CN)

(72) Inventors: Tzu-Yao Lin, Guangzhou City (CN); Shih-Chieh Yen, Guangzhou City (CN)

(73) Assignee: GUANGZHOU LUXVISIONS INNOVATION TECHNOLOGY LIMITED, Guangzhou City (CN)

( * ) Notice: Subject to any disclaimer, the term of this patent is extended or adjusted under 35 U.S.C. 154(b) by 208 days.

(21) Appl. No.: 18/882,785

(22) Filed: Sep. 12, 2024

(65) Prior Publication Data

US 2025/0164758 A1 May 22, 2025

Related U.S. Application Data

(60) Provisional application No. 63/600,741, filed on Nov. 20, 2023.

(30) Foreign Application Priority Data

Jul. 23, 2024 (CN) ......................... 202410992025.8

(51) Int. Cl.

*G02B 13/00* (2006.01)
*G02B 1/00* (2006.01)
*G02B 13/02* (2006.01)

(52) U.S. Cl.

CPC ......... *G02B 13/0065* (2013.01); *G02B 1/002* (2013.01); *G02B 13/0015* (2013.01); *G02B 13/02* (2013.01); *G02B 2207/101* (2013.01)

(58) Field of Classification Search

CPC ........ G02B 13/0045; G02B 9/62; G02B 9/60; G02B 13/18

See application file for complete search history.

(56) References Cited

U.S. PATENT DOCUMENTS

2018/0340119 A1* 11/2018 Piquette .................. C08K 3/22
2020/0284883 A1* 9/2020 Ferreira ................ G01S 7/4817
2022/0102583 A1* 3/2022 Baumheinrich ....... G02B 6/105
2022/0244104 A1* 8/2022 Raczkowski ......... G01J 3/0205

(Continued)

FOREIGN PATENT DOCUMENTS

CN 113917578 1/2022
CN 113934005 1/2022

(Continued)

OTHER PUBLICATIONS

"Office Action of Taiwan Counterpart Application", issued on Jan. 13, 2026, p. 1-p. 8.

*Primary Examiner* — Van N Chow
(74) *Attorney, Agent, or Firm* — JCIPRNET

(57) ABSTRACT

An imaging lens including a metalens and a light-turning element in sequence from an object side to an image side along an optical axis. The light-turning element includes an incident surface, a first reflecting surface, a second reflecting surface, and a light-emitting surface in sequence from the object side to the image side along the optical axis. When entering the imaging lens, rays may be reflected at the first reflecting surface and the second reflecting surface in sequence. The first reflecting surface and the second reflecting surface are inner surfaces of the light-turning element.

17 Claims, 9 Drawing Sheets

(56) References Cited

U.S. PATENT DOCUMENTS

| | | | | |
|---|---|---|---|---|
| 2023/0314776 | A1* | 10/2023 | Yi | G02B 1/002 |
| 2025/0090022 | A1* | 3/2025 | Lin | A61B 3/12 |
| 2026/0006949 | A1* | 1/2026 | Hirao | H10H 20/819 |

FOREIGN PATENT DOCUMENTS

| | | |
|---|---|---|
| CN | 114025062 | 2/2022 |
| CN | 114252984 | 3/2022 |
| CN | 114660780 | 6/2022 |
| CN | 114690387 | 7/2022 |
| CN | 115136035 | 9/2022 |
| CN | 116009125 | 4/2023 |
| CN | 116125566 | 5/2023 |
| CN | 116324566 | 6/2023 |
| CN | 117008296 | 11/2023 |
| TW | 202338404 | 10/2023 |
| TW | 202340780 | 10/2023 |
| WO | 2016134942 | 9/2016 |

* cited by examiner

IMAGING LENS

CROSS-REFERENCE TO RELATED APPLICATION

This application claims the priority benefits of U.S. provisional application Ser. No. 63/600,741, filed on Nov. 20, 2023 and China application serial no. 202410992025.8, filed on Jul. 23, 2024. The entirety of each of the above-mentioned patent applications is hereby incorporated by reference herein and made a part of this specification.

BACKGROUND

Technical Field

This disclosure relates to an optical device, and in particular to an imaging lens.

Description of Related Art

Telephoto lenses usually have a large total lens length (TTL) and often require multiple lenses. Since the size of a cell phone has a specific size that limits the total lens length of its internal imaging lens, fewer telephoto lenses are used in smart phones. Telephoto lenses that require multiple lenses also increase the weight of the smart phone significantly.

SUMMARY

The disclosure provides an imaging lens that does not require multiple lenses, and an optical path thereof is folded, allowing the imaging lens to fit in a limited space.

According to an embodiment of the disclosure, an imaging lens is provided, which includes a metalens and a light-turning element in sequence from an object side to an image side along an optical axis. The light-turning element includes an incident surface, a first reflecting surface, a second reflecting surface, and a light-emitting surface in sequence from the object side to the image side along the optical axis. When entering the imaging lens, a ray is reflected at the first reflecting surface and the second reflecting surface in sequence. The first reflecting surface and the second reflecting surface are inner surfaces of the light-turning element.

Based on the above, the embodiments of the disclosure combine the technology of metalens into an imaging lens, eliminating the need for multiple lenses. The length of the imaging lens is shortened by folding the optical path with a light-turning element. Accordingly, it is possible to provide an imaging lens with good optical performance and small size, and realize a telephoto lens that can be applied to a smart phone with thinnest thickness.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
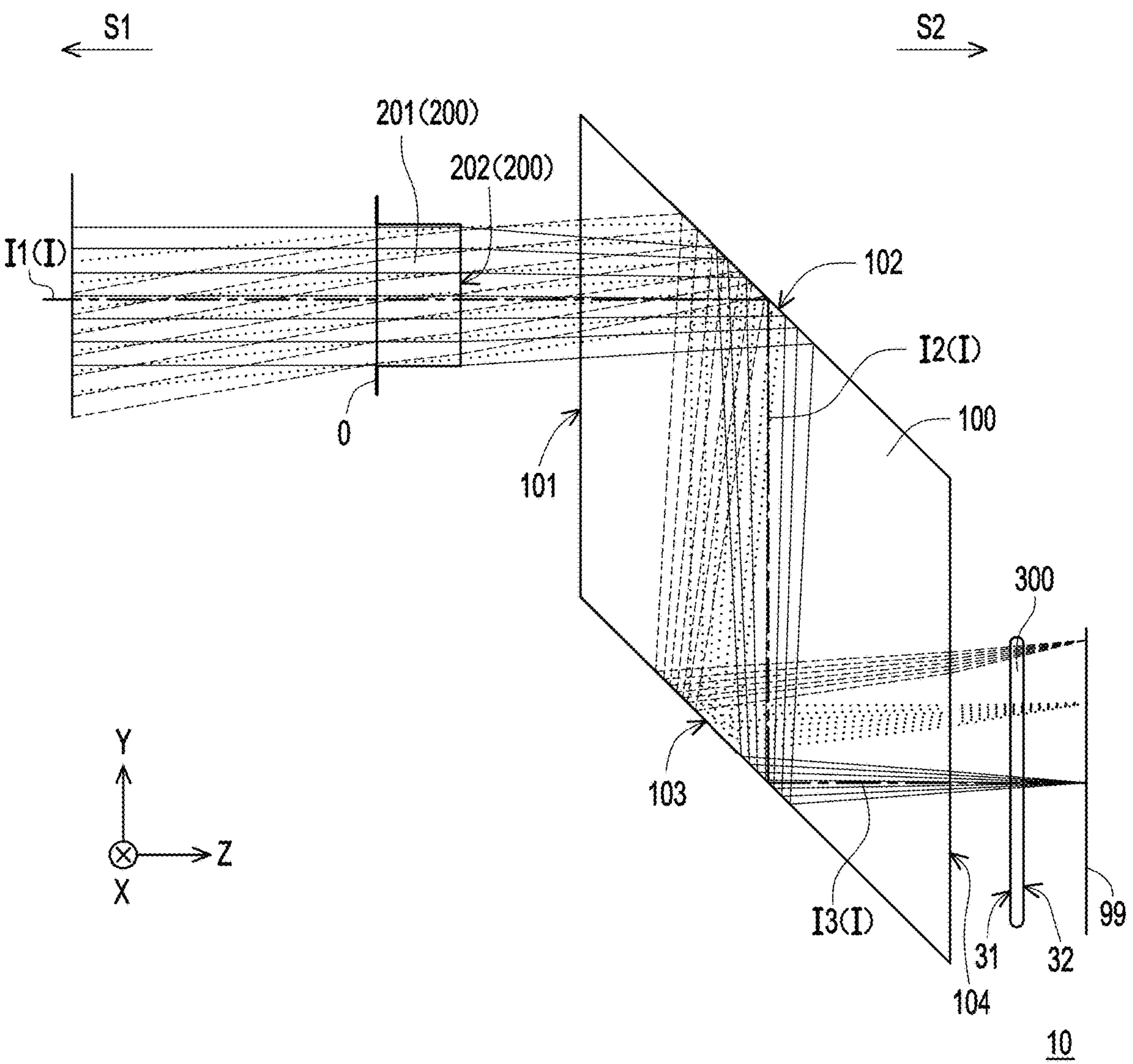
FIG. 1 shows a schematic diagram of an imaging lens according to a first embodiment of the disclosure.

According to a first embodiment of the disclosure, with reference to FIG. 1, FIG. 2A, FIG. 2B, FIG. 2C, FIG. 3A, FIG. 3B, FIG. 3C, and FIG. 3D, an imaging lens 10 is provided. The imaging lens 10 sequentially includes a metalens 200, a light-turning element 100, and a filter 300 along an optical axis I from an object side S1 to an image side S2.

The metalens 200 includes a substrate 201 and a phase retardation structure 202. The phase retardation structure 202 is located on a surface of the substrate 201 facing the image side S2. Moreover, the phase retardation structure 202 is circular and includes a center C1 located on the optical axis I and multiple microstructures SS.

The light-turning element 100 sequentially includes an incident surface 101, a first reflecting surface 102, a second reflecting surface 103, and a light-emitting surface 104 along the optical axis I from the object side S1 to the image side S2. The surfaces are all planes, and the first reflecting surface 102 and the second reflecting surface 103 are parallel. When entering the imaging lens 10, the ray sequentially passes through the substrate 201, the phase retardation structure 202, and the incident surface 101, is reflected on the first reflecting surface 102 and then the second reflecting surface 103, passes through the light-emitting surface 104, and passes through the filter 300. The first reflecting surface 102 and the second reflecting surface 103 are inner surfaces of the light-turning element 100. By configuring the light-turning element 100, a light path is folded so that the length of the imaging lens 10 in a Z direction may be shortened.

The optical axis I includes a first optical axis I1, a second optical axis I2, and a third optical axis I3. When entering the imaging lens 10 along the first optical axis I1 and passes through the center C1 of the phase retardation structure 202, the ray propagates along the second optical axis I2 after being reflected by the first reflecting surface 102, and propagate along the third optical axis I3 after being reflected by the second reflecting surface 103.

In some embodiments, the first reflecting surface 102 and the second reflecting surface 103 may be coated with aluminum and/or silver to improve reflectance. The filter 300 is, for example, an infrared cut-off filter, which can allow rays with appropriate wavelengths (such as infrared or visible light) to pass through, thereby filtering out the desired waveband.

A refractive index of the light-turning element 100 falls in the range of 1.5 to 4.5. The metalens 200 has positive diopter, and the diopter falls in the range of 50D to 150D. The phase retardation structure 202 includes multiple cylindrical-shaped microstructures SS. The ratio between a height H of each cylinder SS in the Z direction and a cylinder diameter D of the cylinder falls within the range of 0.3 to 5. However, the disclosure is not limited thereto. In some embodiments, each microstructure SS can be a cylinder of other shapes.

It should be noted that when light (electromagnetic wave) passes through the phase retardation structure 202, the amplitude and phase of the light change due to the array formed by the microstructures SS, thus changing the traveling direction of the light to achieve the purpose of refraction. Therefore, the metalens 200 with the phase retardation structure 202 can be equivalent to one or more optical lenses with diopter. Also, because the cylinders SS of the phase retardation structure 202 are arranged on the substrate 201 in a circularly symmetrical array, and the center C1 is on the optical axis I, so that the metalens 200 with the phase retardation structure 202 is equivalent to one or more optical lenses having the optical axis I as a symmetric axis. Furthermore, since the metalens 200 can be equivalent to one or more optical lenses and has a very thin thickness compared to other components, the overall size of the imaging lens 10 is greatly reduced. In addition, since the configuration of the microstructures SS has a considerable design margin, the imaging lens 10 can have a considerable margin in design.

In some embodiments, the height H of each microstructure SS in the Z direction falls in a range of 300 nm to 1 μm, the cylinder diameter D falls in a range of 200 nm to 600 nm, and a distance between adjacent microstructures SS falls within a range of 250 nm to 500 nm.

In this first embodiment, each microstructure SS includes amorphous silicon, whose refractive index and extinction coefficient at 632.8 nm are 4.5 and 0.24 respectively. The binary coefficients of the phase retardation structure 202 are shown in Table 1.

TABLE 1

| wavelength (nm) | maximum value | $p^2$ | $p^4$ | $p^6$ | $p^8$ |
|---|---|---|---|---|---|
| 632.8 | 4 | −4.16E+06 | −7.96E+08 | 1.45E+13 | −6.54E+16 |

Figure 3A:
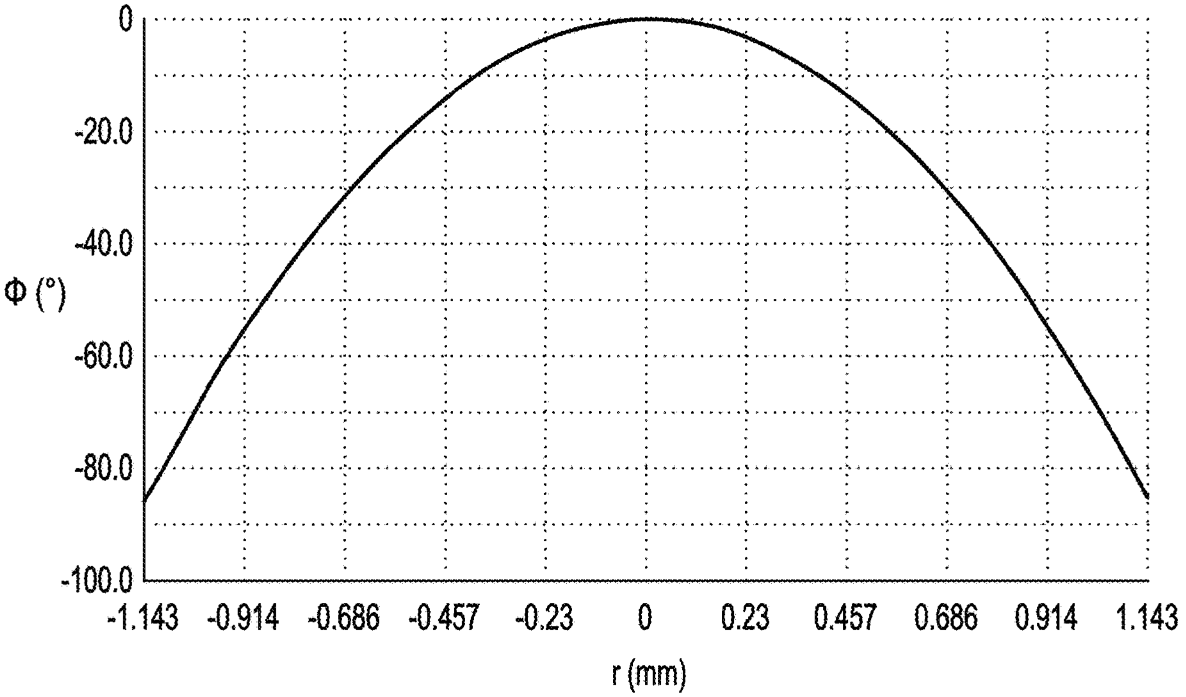
FIG. 3A shows phase retardation caused by a phase retardation structure according to the first embodiment of the disclosure to light with a wavelength of 632.8 nm.
Figure 3D:
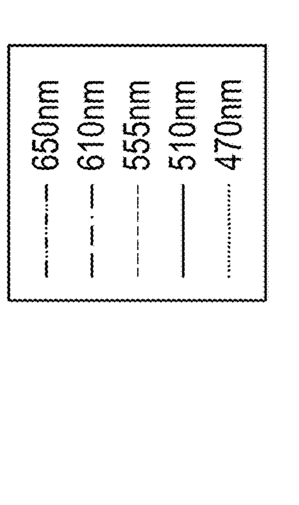
FIG. 3D illustrates a curve diagram of distortion when light with wavelengths of 470 nm, 510 nm, 555 nm, 610 nm, and 650 nm, respectively, is incident on the imaging lens of the first embodiment of the disclosure.
Figure 3D:
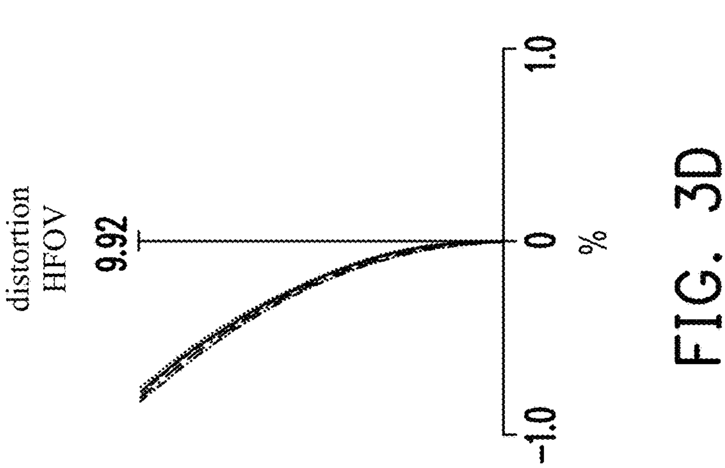

Referring to FIG. 3A, FIG. 3A shows schematic diagram of phase retardation of a phase retardation structure according to the first embodiment. Specifically, FIG. 3A shows phase retardation #caused by a phase retardation structure 202 in FIG. 1 to light with a wavelength of 632.8 nm. At the radius r=0 (i.e., at the center C1 of the phase retardation structure 202), no phase retardation of the light at 632.8 nm occurs (ϕ=0), and as radius r increases (i.e., the farther away from the center C1), greater phase retardation of the light occurs, resulting in the phase retardation structure 202 having a diopter equivalent to that of one or more optical lenses.

Figure 2A:
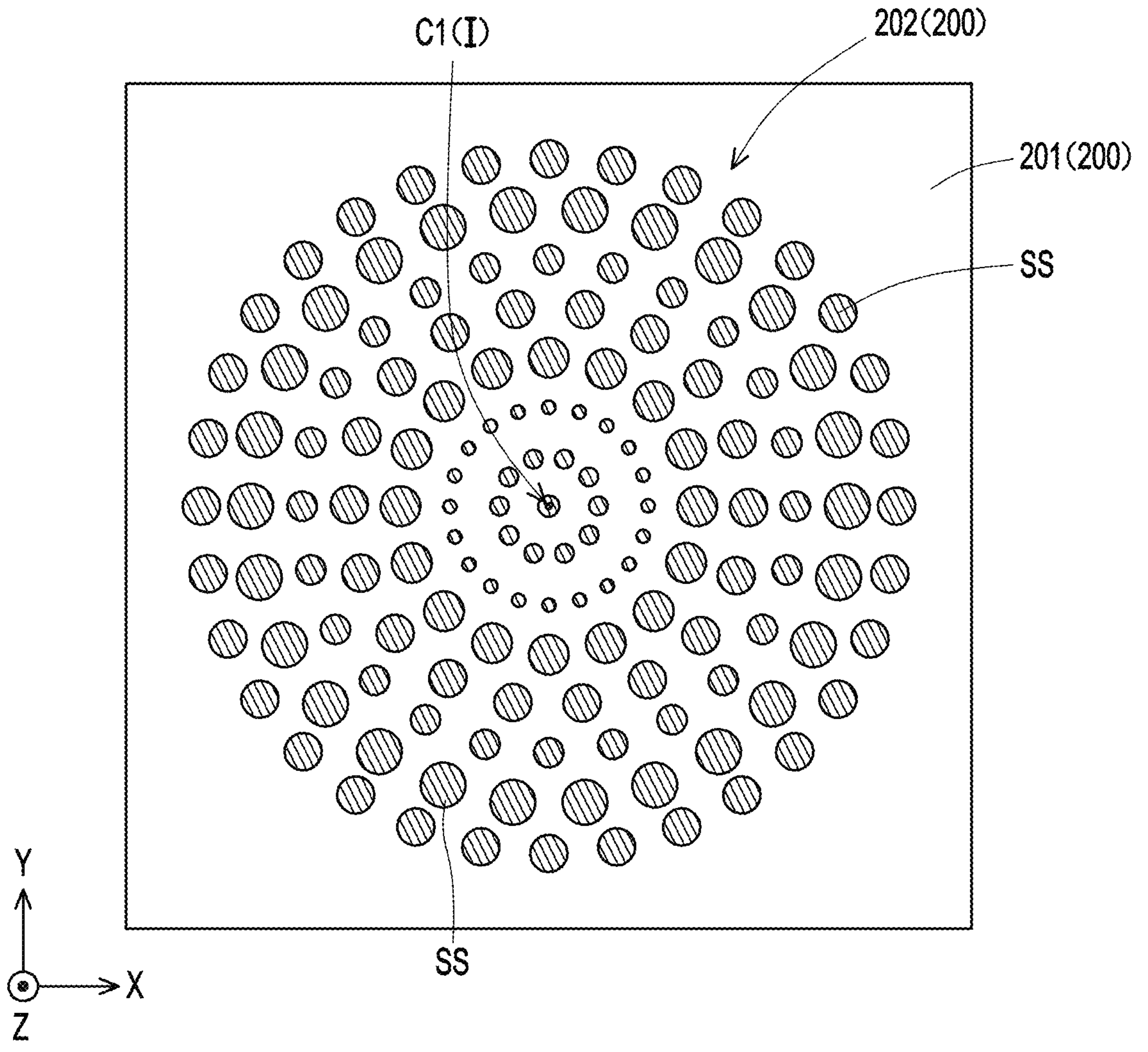
FIG. 2A shows a schematic diagram of a metalens according to an embodiment of the disclosure.
Figure 2B:
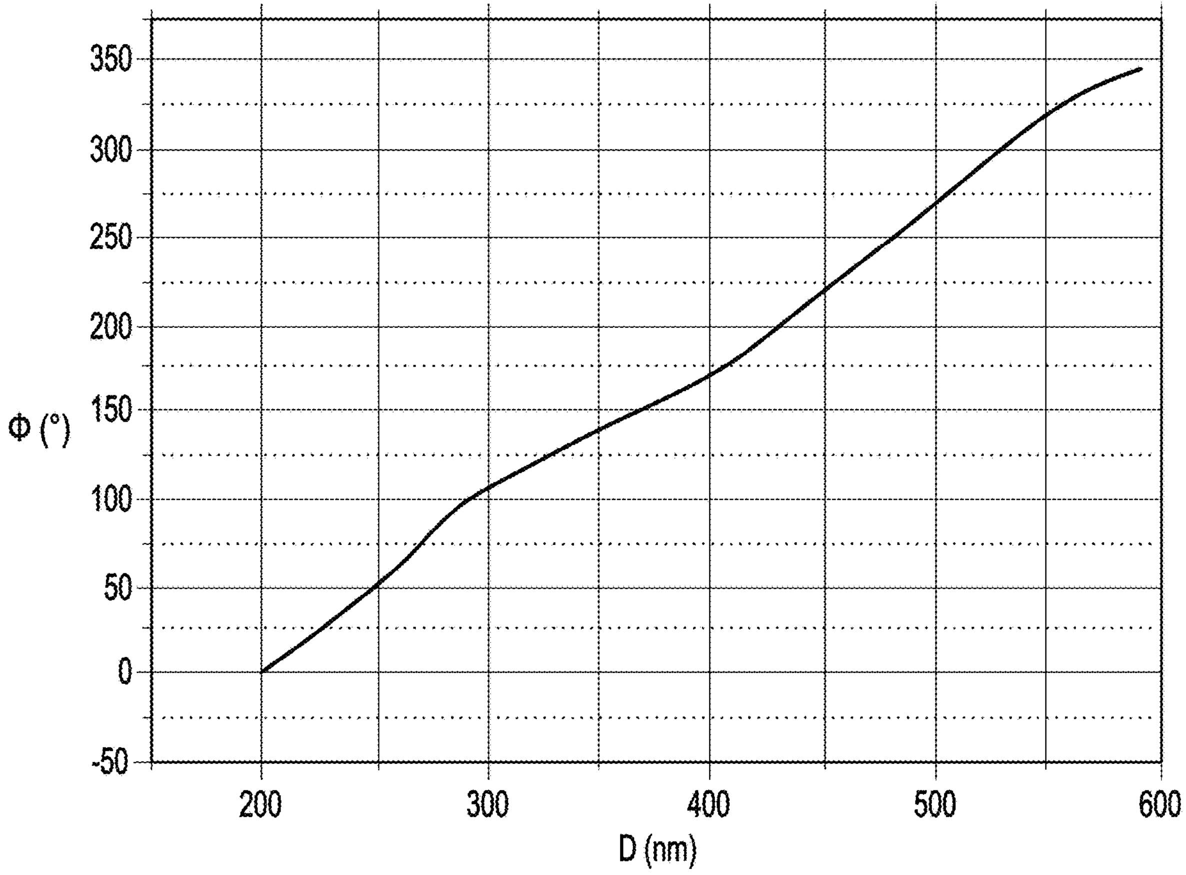
FIG. 2B and FIG. 2C show schematic diagrams of phase retardation caused by microstructures according to embodiments of the disclosure to light at 632.8 nm.
Figure 2C:
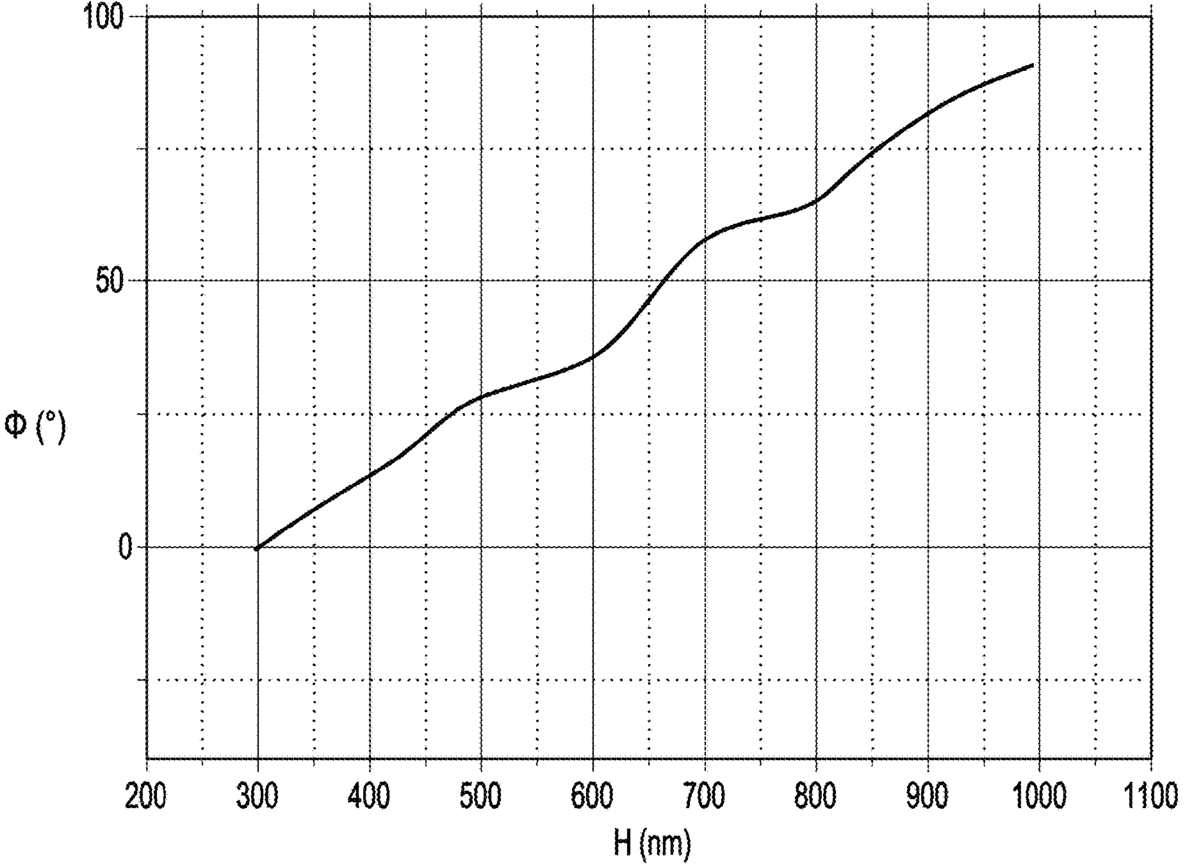

In order to achieve the phase retardation shown in FIG. 3A, the phase retardation structure 202 needs to be configured with each microstructure SS according to the curve diagram shown in FIG. 2B and FIG. 2C. Specifically, in FIG. 2B, the horizontal axis represents the cylinder diameter D of the microstructure SS in the radial direction of the phase retardation structure 202, and the vertical axis represents the phase retardation #caused by the microstructure SS to the light at 632.8 nm. In FIG. 2C, the horizontal axis represents the height H of the microstructure SS in the Z direction, and the vertical axis represents the phase retardation #caused by the microstructure SS to the light at 632.8 nm. Thus, when the curve shown in FIG. 3A is used as the target curve, the cylinder diameter D and the height H of the microstructure SS at the radius r of the phase retardation structure 202 can be determined from the curves of FIG. 2B and FIG. 2C.

The F-number of the imaging lens 10 of this first embodiment falls in a range of 2.0 to 6.0, the field of view (FOV) falls in a range of 10 degrees to 30 degrees, the effective focal length (EFL) falls in a range of 10 mm to 20 mm, and the semi image height falls within a range of 2.0 mm to 3.5 mm. Other detailed optical data of this first embodiment are shown in Table 2, where the phase retardation structure 202 is referred to as structure 202, the light-turning element 100 is referred to as element 100, the first reflecting surface 102 is referred to as reflecting surface 102, and the second reflecting surface 103 is referred to as reflecting surface 103.

TABLE 2

| element | surface | curvature radius (mm) | pitch (mm) | refractive index | Abbe number |
|---|---|---|---|---|---|
| object | | infinite | infinite | | |
| substrate 201 | stop 0 | infinite | 1.38 | 1.52 | 64.17 |
| | structure 202 | infinite | 2.00 | | |
| element 100 | incident surface 101 | infinite | 3.00 | 1.52 | 64.17 |
| | reflecting surface 102 | infinite | 8.00 | | |
| | reflecting surface 103 | infinite | 3.00 | | |
| | light-emitting surface 104 | infinite | 1.00 | | |

TABLE 2-continued

| element | surface | curvature radius (mm) | pitch (mm) | refractive index | Abbe number |
|---|---|---|---|---|---|
| filter 300 | object side surface 31 | infinite | 0.21 | 1.52 | 64.17 |
| | image side surface 32 | infinite | 1.00 | | |
| | imaging surface 99 | infinite | | | |

As shown in Table 2, the stop 0 of the imaging lens 10 and the surface of the substrate 201 facing the object side S1 are coplanar. The pitch (1.38 mm as shown in Table 2) of the stop 0 is the distance between the surface of the substrate 201 facing the object side S1 and the surface of the substrate 201 facing the image side S2 on the optical axis I (first optical axis I1), that is, the thickness of the substrate 201 on the optical axis I (first optical axis I1). The pitch (2.00 mm as shown in Table 2) of the structure 202 (the phase retardation structure 202) is the distance between the surface of the substrate 201 facing the image side S2 (i.e., the surface on which the phase retardation structure 202 is disposed) and the incident surface 101 of the element 100 (light-turning element 100) on the optical axis I (first optical axis I1), that is, the gap between the substrate 201 and the light-turning element 100 on the optical axis I (first optical axis I1). The pitch (3.00 mm as shown in Table 2) of the incident surface 101 is the distance between the incident surface 101 and the first reflecting surface 102 on the optical axis I (first optical axis I1). The pitch (8.00 mm as shown in Table 2) of the first reflecting surface 102 is the distance between the first reflecting surface 102 and the second reflecting surface 103 on the optical axis I (second optical axis I2). The pitch (3.00 mm as shown in Table 2) of the second reflecting surface 103 is the distance between the second reflecting surface 103 and the light-emitting surface 104 on the optical axis I (third optical axis I3). The pitch (1.00 mm as shown in Table 2) of the light-emitting surface 104 is the gap between the light-turning element 100 and the optical filter 300 on the optical axis I (third optical axis I3). The pitch (0.21 mm as shown in Table 2) of the object side surface 31 of the filter 300 is the thickness of the filter 300 on the optical axis I (third optical axis I3). The pitch (1.00 mm as shown in Table 2) of the image side surface 32 of the filter 300 is the gap between the filter 300 and the imaging surface 99 on the optical axis I (third optical axis I3).

Figure 3C:
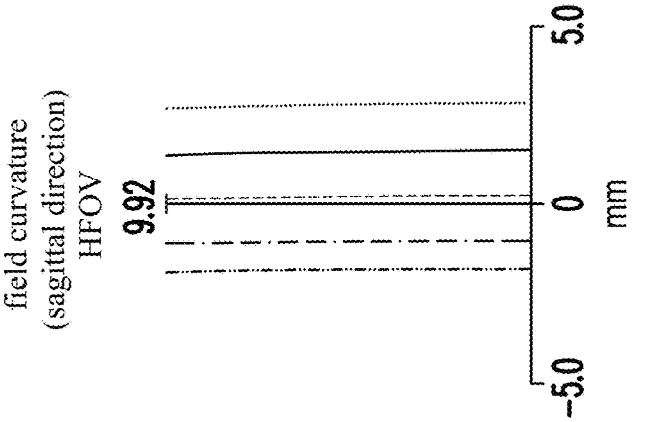
FIG. 3C illustrates a curve diagram of field curvature aberration in sagittal direction when light with wavelengths of 470 nm, 510 nm, 555 nm, 610 nm, and 650 nm, respectively, is incident on the imaging lens of the first embodiment of the disclosure.
Figure 3B:
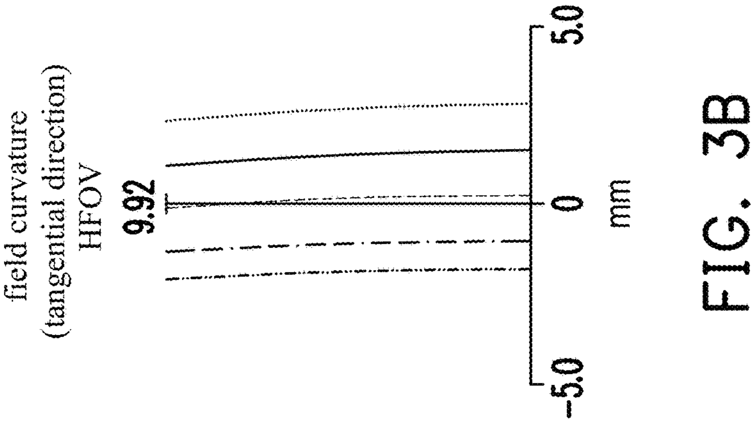
FIG. 3B illustrates a curve diagram of field curvature aberration in tangential direction when light with wavelengths of 470 nm, 510 nm, 555 nm, 610 nm, and 650 nm, respectively, is incident on the imaging lens of the first embodiment of the disclosure.
Figure 4:
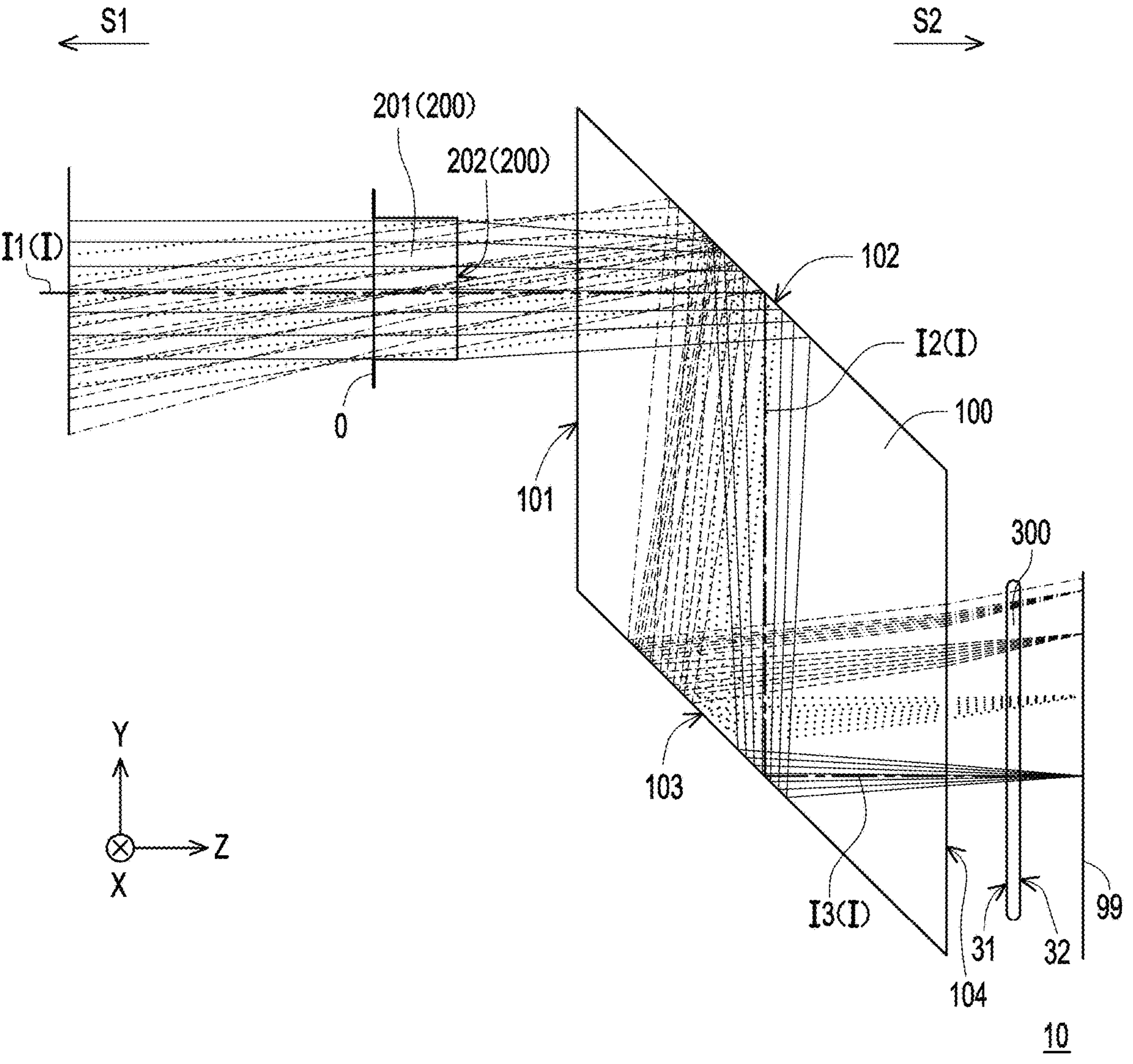
FIG. 4 shows a schematic diagram of an imaging lens according to a second embodiment of the disclosure.

As shown in the curve diagrams of field curvature aberration of FIG. 3B and FIG. 3C, the field curvature aberration of the five representative wavelengths in the entire field of view falls within ±3.0 mm, indicating that the imaging lens 10 of this first embodiment can effectively eliminate field curvature aberration. As shown in the curve diagram of distortion in FIG. 3D, the distortion aberration of the five representative wavelengths in the entire field of view is less than ±1.0%, indicating that the imaging lens 10 of this first embodiment has good imaging quality.

According to a second embodiment, with reference to FIG. 4, FIG. 2A, FIG. 2B, FIG. 2C, FIG. 5A, FIG. 5B, FIG. 5C, and FIG. 5D, an imaging lens 10 is provided. The first reflecting surface 102 and the second reflecting surface 103 are inner surfaces of the light-turning element 100.

The metalens 200 includes a substrate 201 and a phase retardation structure 202. The phase retardation structure 202 is located on a surface of the substrate 201 facing the image side S2. Moreover, the phase retardation structure 202 is circular and includes a center C1 located on the optical axis I and multiple microstructures SS.

The light-turning element 100 sequentially includes an incident surface 101, a first reflecting surface 102, a second reflecting surface 103, and a light-emitting surface 104 along the optical axis I from the object side S1 to the image side S2. The surfaces are all planes. When entering the imaging lens 10, the ray sequentially passes through the substrate 201, the phase retardation structure 202, and the incident surface 101, is reflected on the first reflecting surface 102 and then the second reflecting surface 103, passes through the light-emitting surface 104, and passes through the filter 300. The first reflecting surface 102 and the second reflecting surface 103 are the inner surfaces of the light-turning element 100.

The optical axis I includes a first optical axis I1, a second optical axis I2, and a third optical axis I3. When entering the imaging lens 10 along the first optical axis I1 and passes through the center C1 of the phase retardation structure 202, the ray travels along the second optical axis I2 after being reflected by the first reflecting surface 102, and propagate along the third optical axis I3 after being reflected by the second reflecting surface 103.

A refractive index of the light-turning element 100 falls in the range of 1.5 to 4.5. The metalens 200 has positive diopter, and the diopter falls in the range of 50D to 150D. The phase retardation structure 202 includes multiple cylindrical-shaped microstructures SS. The ratio between a height H of each cylinder SS in the Z direction and a cylinder diameter D of the cylinder falls within the range of 0.3 to 5. However, the disclosure is not limited thereto. In some embodiments, each microstructure SS can be a cylinder of other shapes.

In some embodiments, the height H of each microstructure SS in the Z direction falls in a range of 300 nm to 1 μm, the cylinder diameter D falls in a range of 200 nm to 600 nm, and a distance between adjacent microstructures SS falls within a range of 250 nm to 500 nm.

In this second embodiment, each microstructure SS includes amorphous silicon, whose refractive index and extinction coefficient at 632.8 nm are 2.28 and 0.06 respectively. The binary coefficients of the phase retardation structure 202 are shown in Table 3.

TABLE 3

| wavelength (nm) | maximum value | $p^2$ | $p^4$ | $p^6$ | $p^8$ |
|---|---|---|---|---|---|
| 632.8 | 4 | −5.62E+06 | 7.97E+10 | −1.64E+15 | 1.12E+19 |

Figure 5A:
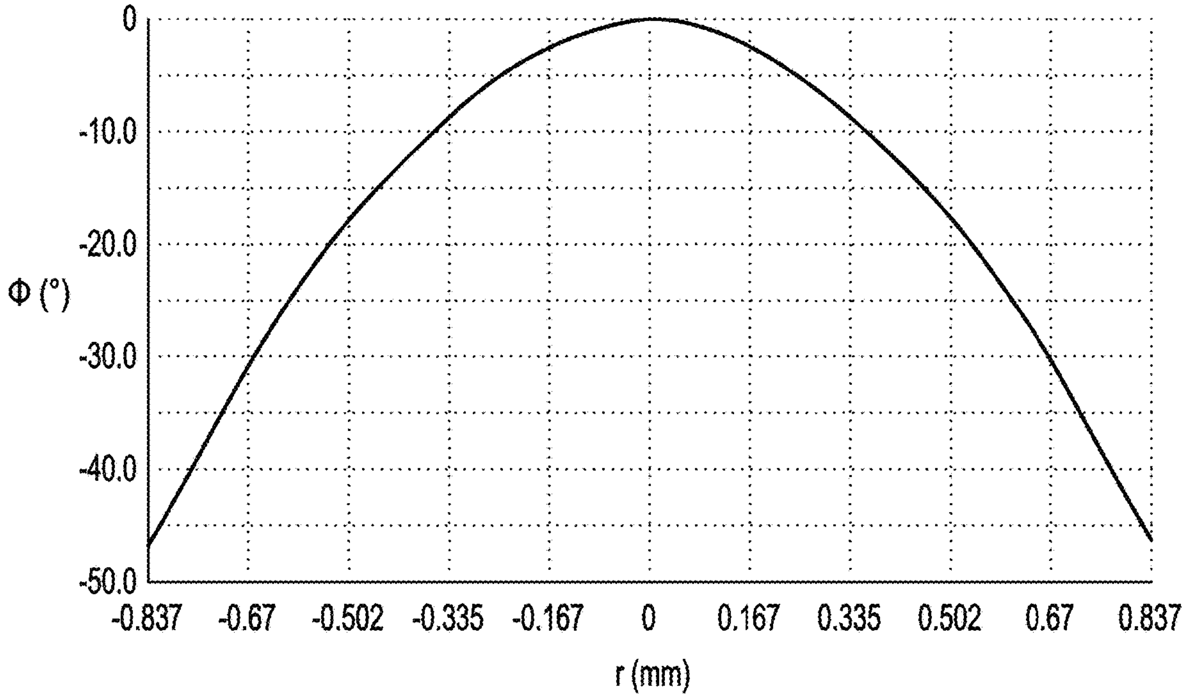
FIG. 5A shows phase retardation caused by a phase retardation structure according to the second embodiment of the disclosure to light with a wavelength of 632.8 nm.

Referring to FIG. 5A, FIG. 5A shows schematic diagram of phase retardation of a phase retardation structure according to the second embodiment. Specifically, FIG. 5A shows phase retardation ϕ caused by a phase retardation structure 202 in FIG. 4 to light with a wavelength of 632.8 nm. At the radius r=0 (i.e., at the center C1 of the phase retardation structure 202), no phase retardation of the light at 632.8 nm occurs (ϕ=0), and as radius r increases (i.e., the farther away from the center C1), greater phase retardation of the light occurs, resulting in the phase retardation structure 202 having a diopter equivalent to that of one or more optical lenses.

In order to achieve the phase retardation shown in FIG. 5A, the phase retardation structure 202 needs to be configured with each microstructure SS according to the curve diagram shown in FIG. 2B and FIG. 2C. Specifically, in FIG. 2B, the horizontal axis represents the cylinder diameter D of the microstructure SS in the radial direction of the phase retardation structure 202, and the vertical axis represents the phase retardation #caused by the microstructure SS to the light at 632.8 nm. In FIG. 2C, the horizontal axis represents the height H of the microstructure SS in the Z direction, and the vertical axis represents the phase retardation #caused by the microstructure SS to the light at 632.8 nm. Thus, when the curve shown in FIG. 5A is used as the target curve, the cylinder diameter D and the height H of the microstructure SS at the radius r of the phase retardation structure 202 can be determined from the curves of FIG. 2B and FIG. 2C.

The F-number (F #) of the imaging lens 10 of this second embodiment falls in a range of 6.0 to 10.0, the field of view (FOV) falls in a range of 10 degrees to 30 degrees, the effective focal length (EFL) falls in a range of 10 mm to 20 mm, and the semi image height falls within a range of 2.0 mm to 3.5 mm. Other detailed optical data of this first embodiment are shown in Table 4, where the phase retardation structure 202 is referred to as structure 202, the light-turning element 100 is referred to as element 100, the first reflecting surface 102 is referred to as reflecting surface 102, and the second reflecting surface 103 is referred to as reflecting surface 103.

TABLE 4

| element | surface | curvature radius (mm) | pitch (mm) | refractive index | Abbe number |
|---|---|---|---|---|---|
| object | | infinite | infinite | | |
| substrate 201 | stop 0 | infinite | 1.38 | 1.52 | 64.17 |
| | structure 202 | infinite | 2.00 | | |
| element 100 | incident surface 101 | infinite | 3.00 | 1.52 | 64.17 |
| | reflecting surface 102 | infinite | 8.00 | | |
| | reflecting surface 103 | infinite | 3.00 | | |
| | light-emitting surface 104 | infinite | 1.00 | | |
| filter 300 | object side surface 31 | infinite | 0.21 | 1.52 | 64.17 |
| | image side surface 32 | infinite | 1.00 | | |
| | imaging surface 99 | infinite | | | |

As shown in Table 4, the stop 0 of the imaging lens 10 and the surface of the substrate 201 facing the object side S1 are coplanar. The pitch (1.38 mm as shown in Table 4) of the stop 0 is the distance between the surface of the substrate 201 facing the object side S1 and the surface of the substrate 201 facing the image side S2 on the optical axis I (first optical axis I1), that is, the thickness of the substrate 201 on the optical axis I (first optical axis I1). The pitch (2.00 mm as shown in Table 4) of the structure 202 (the phase retardation structure 202) is the distance between the surface of the substrate 201 facing the image side S2 (i.e., the surface on which the phase retardation structure 202 is disposed) and the incident surface 101 of the element 100 (light-turning element 100) on the optical axis I (first optical axis I1), that is, the gap between the substrate 201 and the light-turning element 100 on the optical axis I (first optical axis I1). The pitch (3.00 mm as shown in Table 4) of the incident surface 101 is the distance between the incident surface 101 and the first reflecting surface 102 on the optical axis I (first optical axis I1). The pitch (8.00 mm as shown in Table 4) of the first reflecting surface 102 is the distance between the first reflecting surface 102 and the second reflecting surface 103 on the optical axis I (second optical axis I2). The pitch (3.00 mm as shown in Table 4) of the second reflecting surface 103 is the distance between the second reflecting surface 103 and the light-emitting surface 104 on the optical axis I (third optical axis I3). The pitch (1.00 mm as shown in Table 4) of the light-emitting surface 104 is the gap between the light-turning element 100 and the optical filter 300 on the optical axis I (third optical axis I3). The pitch (0.21 mm as shown in Table 4) of the object side surface 31 of the filter 300 is the thickness of the filter 300 on the optical axis I (third optical axis I3). The pitch (1.00 mm as shown in Table 4) of the image side surface 32 of the filter 300 is the gap between the filter 300 and the imaging surface 99 on the optical axis I (third optical axis I3).

Figures 5B, 5C, 5D:
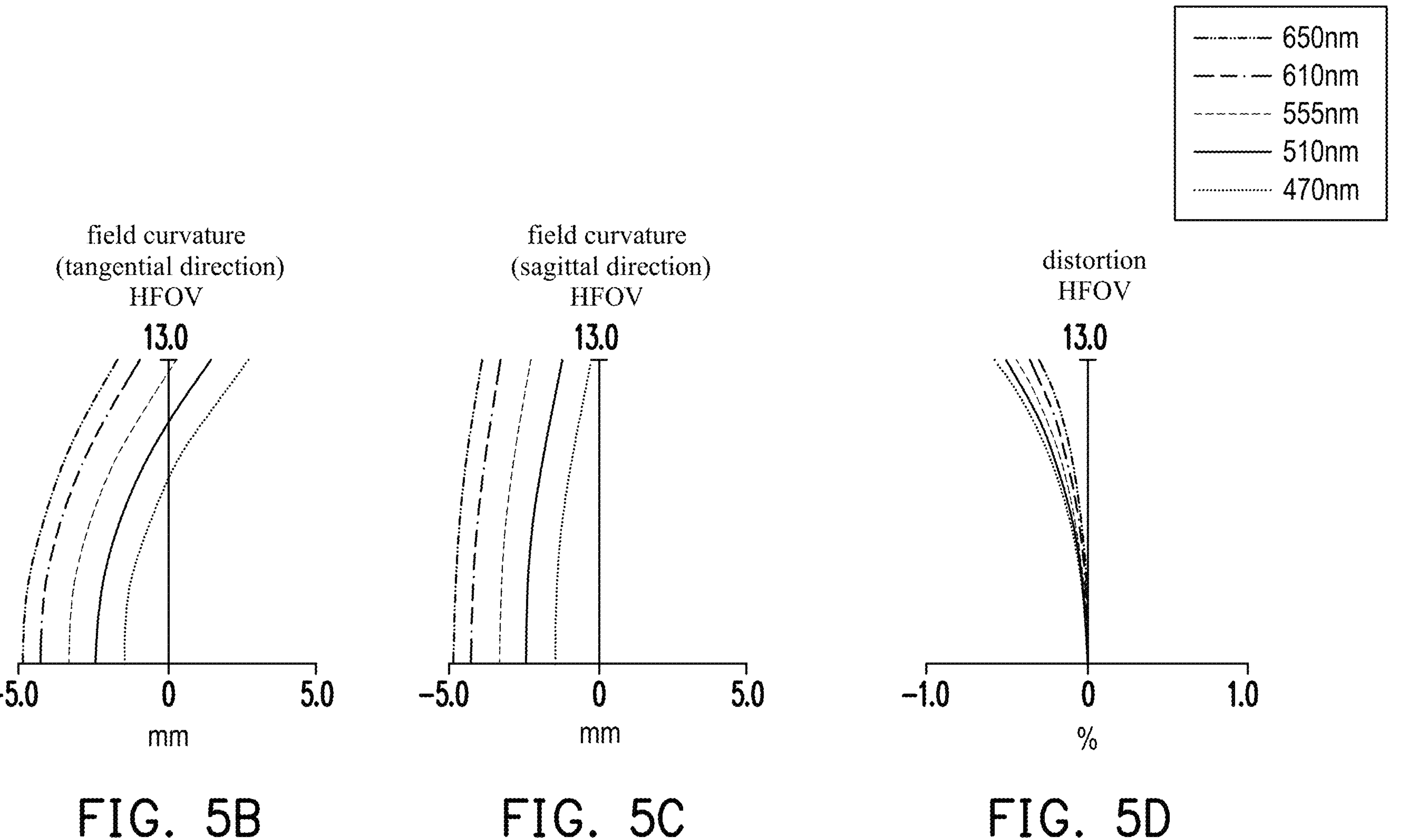
FIG. 5B illustrates a curve diagram of field curvature aberration in tangential direction when light with wavelengths of 470 nm, 510 nm, 555 nm, 610 nm, and 650 nm, respectively, is incident on the imaging lens of the second embodiment of the disclosure.
FIG. 5C illustrates a curve diagram of field curvature aberration in sagittal direction when light with wavelengths of 470 nm, 510 nm, 555 nm, 610 nm, and 650 nm, respectively, is incident on the imaging lens of the second embodiment of the disclosure.
FIG. 5D illustrates a curve diagram of distortion when light with wavelengths of 470 nm, 510 nm, 555 nm, 610 nm, and 650 nm, respectively, is incident on the imaging lens of the second embodiment of the disclosure.

As shown in the curve diagrams of field curvature aberration of FIG. 5B and FIG. 5C, the field curvature aberration of the five representative wavelengths in the entire field of view falls within ±5.0 mm, indicating that the imaging lens 10 of this first embodiment can effectively eliminate field curvature aberration. As shown in the curve diagram of distortion in FIG. 5D, the distortion aberration of the five representative wavelengths in the entire field of view is less than ±0.6%, indicating that the imaging lens 10 of this second embodiment has good imaging quality.

To sum up, the embodiments of the disclosure combine the technology of metalens into an imaging lens, eliminating the need for multiple lenses. The length of the imaging lens is shortened by folding the optical path with a light-turning element. Accordingly, it is possible to provide an imaging lens with good optical performance and small size, and realize a telephoto lens that can be applied to a smart phone.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An imaging lens, comprising in sequence from an object side to an image side along an optical axis:

a metalens; and a light-turning element, comprising an incident surface, a first reflecting surface, a second reflecting surface, and a light-emitting surface in sequence from the object side to the image side along the optical axis, wherein when entering the imaging lens, a ray is reflected at the first reflecting surface and the second reflecting surface in sequence, and the first reflecting surface and the second reflecting surface are inner surfaces of the light-turning element.

2. The imaging lens according to claim 1, wherein the first reflecting surface and the second reflecting surface are planes and parallel to each other.

3. The imaging lens according to claim 1, wherein the incident surface and the light-emitting surface are planes.

4. The imaging lens according to claim 1, wherein the metalens is located between a stop of the imaging lens and the light-turning element.

5. The imaging lens according to claim 1, wherein the metalens has positive diopter, and the diopter falls within a range of 50D to 150D.

6. The imaging lens according to claim 5, wherein the only element with diopter in the imaging lens is the metalens.

7. The imaging lens according to claim 5, wherein a refractive index of the light-turning element falls within a range of 1.5 to 4.5.

8. The imaging lens according to claim 5, wherein the metalens comprises a plurality of cylinders, and a ratio between a height and a diameter of the cylinders falls within a range of 0.3 to 5.

9. The imaging lens according to claim 8, wherein the height of the cylinders falls within a range of 300 nm to 1 μm.

10. The imaging lens according to claim 8, wherein the diameter of the cylinders falls within a range of 200 nm to 600 nm.

11. The imaging lens according to claim 8, wherein a distance between the adjacent cylinders falls within a range of 250 nm to 500 nm.

12. The imaging lens according to claim 5, wherein a F-number of the imaging lens falls within a range of 2.0 to 6.0.

13. The imaging lens according to claim 5, wherein a field of view of the imaging lens falls within a range of 10 degrees to 30 degrees.

14. The imaging lens according to claim 5, wherein a focal length of the imaging lens falls within a range of 10 mm to 20 mm.

15. The imaging lens according to claim 5, wherein a semi image height of the imaging lens falls within a range of 2.0 mm to 3.5 mm.

16. The imaging lens according to claim 5, wherein a F-number of the imaging lens falls within a range of 6.0 to 10.0.

17. The imaging lens according to claim 1, further comprising a metal layer located on the first reflecting surface and the second reflecting surface, the metal layer comprising aluminum and silver.

* * * * *